(12) United States Patent
Patel et al.

(10) Patent No.: US 8,699,354 B2
(45) Date of Patent: Apr. 15, 2014

(54) METHOD AND APPARATUS FOR DETECTING A FAULT ON AN OPTICAL FIBER

(75) Inventors: Jagdish S. Patel, Santa Clara, CA (US);
Keshav Kamble, Fremont, CA (US);
Gregory Allen Foster, Gilroy, CA (US)

(73) Assignee: Rockstar Consortium US LP, Plano, TX (US)

( * ) Notice: Subject to any disclaimer, the term of this patent is extended or adjusted under 35 U.S.C. 154(b) by 1715 days.

(21) Appl. No.: 11/314,678

(22) Filed: Dec. 21, 2005

(65) Prior Publication Data

US 2007/0140688 A1 Jun. 21, 2007

(51) Int. Cl.
*H04J 1/16* (2006.01)
*H04L 12/26* (2006.01)

(52) U.S. Cl.
CPC ............................. *H04L 43/50* (2013.01)
USPC ............................... 370/242; 398/17

(58) Field of Classification Search
USPC ............... 370/216, 228, 241, 242, 252, 253;
398/10, 13, 17, 20
See application file for complete search history.

(56) References Cited

U.S. PATENT DOCUMENTS

| | | | | |
|---|---|---|---|---|
| 7,289,449 B1 * | 10/2007 | Rubinstein et al. | ........... | 370/245 |
| 7,450,519 B2 * | 11/2008 | Yamauchi | ...................... | 370/243 |
| 2001/0052084 A1 * | 12/2001 | Huang et al. | ....................... | 714/4 |
| 2004/0022197 A1 * | 2/2004 | Gagnon | ......................... | 370/242 |
| 2004/0085894 A1 * | 5/2004 | Wang et al. | ..................... | 370/216 |
| 2005/0073965 A1 * | 4/2005 | Yamauchi | ...................... | 370/293 |
| 2006/0013210 A1 * | 1/2006 | Bordogna et al. | ............ | 370/389 |

* cited by examiner

*Primary Examiner* — Kan Yuen
(74) *Attorney, Agent, or Firm* — Withrow & Terranova, PLLC

(57) ABSTRACT

The mode of operation in which a port is configured to operate may be selected so that the manner in which the port will interpret a loss of signal on a receive fiber may be specified. In an immediate mode, the port will interpret a loss of signal on a receive fiber as an indication of a fault on the transmit fiber (or interfaces associated with the transmit fiber) and will immediately shut its transmit interface down. In a multiple cycle detection mode, the port will not immediately interpret a loss of signal on a receive fiber as an indication of a fault on the transmit fiber, but rather will begin monitoring the receive fiber to look for a specified loss of signal pattern on the receive fiber. In this mode the port will interpret a repetitive loss of signal on the receive fiber as an indication of a fault on the transmit fiber. By providing a mode selector, the manner in which the ports are configured to operate may be adjusted individually, as a group, or globally.

13 Claims, 3 Drawing Sheets

METHOD AND APPARATUS FOR DETECTING A FAULT ON AN OPTICAL FIBER

BACKGROUND OF THE INVENTION

1. Field of the Invention

The present invention relates to communication networks and, more particularly, to a method and apparatus for detecting a fault on an optical fiber.

2. Description of the Related Art

Communication networks may include various routers, switches, bridges, hubs, and other network devices coupled to and configured to pass data to one another. These devices will be referred to herein as "network elements." Data is communicated through the communication network by passing logical associations of bits/bytes of data in the form of packets between the network elements over one or more communication links between the devices.

When optical fibers are used to provide communication links between two devices, they are usually deployed in pairs, with each fiber in the pair providing a unidirectional path between the two devices. The optical fibers are connected to the network elements at communication ports, such that an optical transmitter of one port is connected to an optical receiver of another port and vice versa. Since fibers are generally used for unidirectional communication, when a fiber fails or when a far end receiver fails, the transmitting device will not naturally know that the data it is transmitting is not reaching its peer receiver. Accordingly, remote fault indication mechanisms have been developed to enable the network element on the opposite end of the optical fiber to notify the transmitting network element via a second optical fiber that there is a fault on the other fiber.

FIG. 1 illustrates an example two fiber bidirectional communication link 10 that may be used in a communication network. As shown in FIG. 1, the communication link includes ports 12$a$, 12$b$ on either ends of two or more fibers 14. In this example, each fiber carries data in one direction, either from port 12$a$ to port 12$b$, or from port 12$b$ to port 12$a$. Transmit interfaces 16$a$, 16$b$ are used to transmit data onto the fibers at port 12$a$ and 12$b$, respectively. Receive interfaces 18$b$, 18$a$ are used to receive data from the fibers 14$a$, 14$b$, respectively. Data to be transmitted over the ports 12$a$, 12$b$, is received from switch fabrics 20$a$, 20$b$, associated with the network elements hosting the ports. In the absence of any data to be transmitted, the transmit interfaces 16$a$, 16$b$ will still typically output light at a relatively constant level. When data is present to be transmitted, the output light will be modulated to enable the receive interface to extract the data from the optical signal on the optical fiber 14.

FIG. 1 shows the normal condition with both ports 12$a$, 12$b$ operating and both fibers 14$a$, 14$b$ intact. FIG. 2 shows an example of a failure in which a fiber break on one of the fibers 14$a$ prevents data from being transmitted from transmit interface 16$a$ to receive interface 18$b$. Although FIG. 2 shows a fault on the fiber 14$a$, other faults such as a fault in the transmit interface 16$a$ or a fault in the receive interface 18$b$ may occur as well and would, in practice, be indistinguishable from a fault on the fiber 14$a$. As shown in FIG. 2, the network element associated with the port 12$a$ may not be aware of the fault on the fiber 14$a$, and thus continue to transmit data over the port 12$a$. To enable this fault to be communicated back to port 12$a$, port 12$b$ or the network element associated with the port 12$b$ will need to sense the fault on the fiber, shut down the receiver 18$b$, and then communicate the fault over the remaining available fiber 14$b$ so that port 12$a$ is able to cease transmission of data on transmit interface 16$a$.

Generally, link failure detection is performed in hardware using Far End Fault Indication (FEFI) or Remote Fault Indication (RFI), both of which are industry standards for detecting link failure using pre-configured hardware circuits. Where hardware detection of a failure is not available or is cost prohibitive to implement, a software method may be used.

There are currently two ways in which software has been implemented in optical networking equipment to detect a failure on a link. In both of these methods, when a port, such as port 12$b$, detects a failure on a fiber, it will turn its transmit laser off and on at a specified frequency and duty cycle. Specifically, the port that detects a failure will oscillate power to its transmit laser off and on so that the transmit laser periodically stops sending light over the fiber. The frequency and duty cycle of the transmit laser oscillations may be, for example, one oscillation every 12 seconds with the signal being off for 4 seconds and on for 8 seconds, as shown in FIG. 3.

The difference between the two ways of using software to detect a failure on a link is in how the receiver 18$a$ interprets a loss of signal on the fiber 14$b$. In either instance, a loss of signal on the receive interface 18$a$ will cause the port 12$a$ to determine that the receive interface 18$a$ is down. However, since the loss of signal may be an isolated loss of signal or a periodically generated loss of signal intentionally being generated by the far end port 20$b$ as an attempt to signal a failure on the fiber 14$a$, the loss of signal is monitored by the port so that it can determine how to operate its transmit interface.

In one method (immediate mode), a loss of signal on the receive interface 18$a$ is immediately assumed to be intentionally generated as part of the oscillating off/on pattern associated with a failure on fiber 14$a$, so that the transmit interface 16$a$ is immediately shut down upon detection of a loss of signal on fiber 14$b$. Using this method allows the transmit interface 16$a$ to be shut down quickly in the event of a failure on fiber 14$a$ so that minimal data will be lost should a failure occur on that fiber. However, this mode of operation also causes the transmit interface to be shut down any time a fiber is disconnected for a short period of time, which may occur for maintenance such as re-routing of cables and for other common reasons. For example, if fiber 14$b$ were to be disconnected in FIG. 1, use of immediate mode would cause the other fiber in the fiber pair 14$a$ to be shut down by causing transmit interface 16$a$ to cease transmission. Additionally, the transmit interface 16$a$ may be required to be shut down for a full cycle to enable the port 12$a$ to determine whether the loss of signal at receive interface 18$a$ was part of an isolated incident or was part of an intentionally generated off/on oscillation pattern intended to signal a fault on fiber 14$a$.

In another method (multiple cycle detection mode), a loss of signal on the receive interface 18$a$ is not assumed to be part of the off/on pattern associated with a failure on fiber 14$a$ until five off/on cycles have been received. This method enables a fiber to be disconnected for a short period of time without causing the port 12$a$ to unnecessarily disable the peer fiber by shutting down the transmit interface 16$a$. However, since it takes five cycles to recognize the off/on pattern as indicating a fault on fiber 14$a$, a significant amount of data may be lost while the port is waiting to determine if there is a fault on the fiber.

Conventionally, if a network element included the ability to detect a fault on a fiber using software, the network element would be configured to implement only one of these methods. Specifically, depending on the particular network element, the network element would be programmed to use either the multiple cycle detection mode or the immediate mode. Accordingly, it would be advantageous to provide a way to choose an immediate mode or multiple detection mode, or in general, any intermediate setting to detect a fault on a communication link.

SUMMARY OF THE INVENTION

According to an embodiment of the invention, a network administrator is provided with the option to switch the mode of operation for a given port, group of ports, I/O card, or network element, so that the particular failure detection method is user selectable and changeable during operation. By making the fault indication mode user selectable and changeable, the manner in which a network detects and reacts to failures on an optical fiber may be selected independent of the network element on which the port is implemented. By making the fault detection method dynamically changeable, the mode may be altered to enable the network element to operate in an optimum manner under different conditions. For example, the network element mode may be placed into the multiple cycle detection mode during routine maintenance and may be placed into immediate mode during normal operation.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

According to an embodiment of the invention, a mode selector is provided in a network element to set the mode in which the fiber fault detection software operates so that one of a plurality of modes may be used to detect a fault on an associated fiber.

Figure 4:
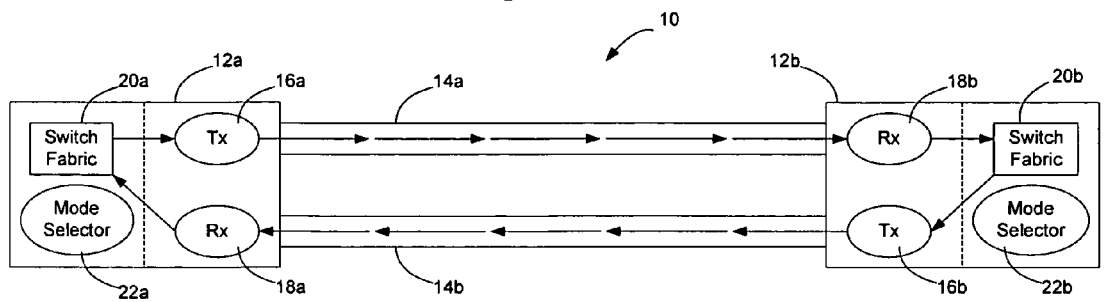
FIG. 4 is a functional block diagram of an optical link employing ports configured according to an embodiment of the invention.

FIG. 4 shows an embodiment of the invention in which the ports on either end of a pair of optical fibers are configured to enable the mode of operation of the software implemented fiber fault detection to be user selectable. According to an embodiment of the invention, a mode selector is provided to enable a network administrator, or other individual with authority to change the mode of operation of the network element, to change the manner in which the port interprets a loss of signal or loss of signal pattern at a receiver. Thus, for example, the mode selector may enable the network administrator to switch the fiber fault detection mode from multiple cycle detection mode to immediate mode. Additionally, in the multiple cycle detection mode, the network administrator may be allowed to select the number of cycles that will be required to be detected prior to declaring a fault on the transmit fiber 14a.

Figure 3:
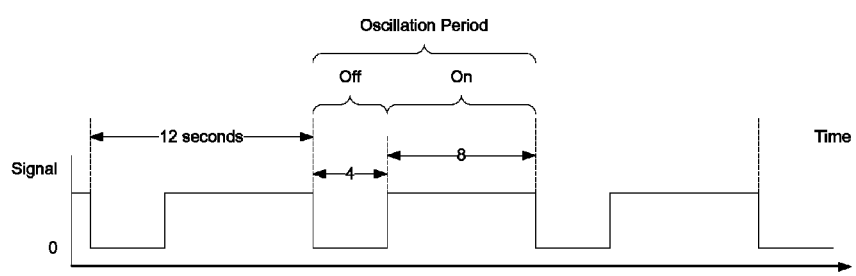
FIG. 3 is a laser modulation pattern that may be used to detect a fault on an optical fiber.

As described above, when a port 12 detects a loss of signal at its receiver 18, it will toggle the laser associated with the transmitter 16 on and off at a specified frequency and duty cycle whenever the port is not receiving laser light from the far end of the link. For example the transmitter 16 may turn off its laser for 4 seconds and on for 8 seconds, as shown in FIG. 3.

The far end of the link receiving the oscillating signal will detect and identify the oscillations as being generated by the fiber fault detection application using one of the modes (multiple cycle detection mode, immediate mode, or another user-defined mode) selected using the mode selector. When a fault is confirmed on the fiber, the port will report the fiber as down to its associated network element, and stop transmitting and receiving until the oscillations stop. Note that although it is possible for a signal to be present on a fiber for part of the cycle, and thus may appear to the far end that the link is up, the far end will not report the link as "up" to the network element until it is certain that the oscillations have stopped.

The multiple cycle detection mode is configured to allow normal network maintenance operations, such as cable moves, to occur with little or no impact on the regular link up/down processing times. Specifically, since the far end must see an oscillating off/on patter with a particular periodicity and duty cycle, the fiber may be temporarily disconnected so that work may be performed on a fiber without causing the other fiber in the fiber pair to be shut down. Accordingly, the network administrator may determine that the network element on the far end of a fiber to be replaced should be set into multiple cycle detection mode during routine maintenance to prevent other fibers from being affected by the work on the network.

In operation, when the port is set to operate in the multiple cycle detection mode, the port controller 86 (see FIG. 6) will be notified every time the link goes down or up (e.g., link down, up, down, up, down, up, down, up, down). Then after the $5^{th}$ down cycle (plus a few seconds to allow the network element to process the link down), the other port will determine that the appropriate signaling pattern has been detected, shutdown that port's transmit and receive capabilities, and keep the port down from the network element's viewpoint as long as the oscillating signal is present.

Using the signaling pattern described herein in connection with FIG. 3, if the oscillating signal is truly present, the $5^{th}$ link down will occur after 48 seconds after the $1^{st}$ link down. Adding 2 seconds to this time to allow the network element to process the $5^{th}$ link down brings the total time required for link down signaling to be detected using this algorithm to 50 seconds. The code implementing the signaling detection simply needs to check for 5 link downs in 50 seconds, with the clock beginning after the $1^{st}$ link down is detected. If 5 link downs are detected in 50 seconds, link down signaling would be declared as detected, and the actions described earlier would occur. If 5 link downs are not detected in the 50 second period the link downs were not caused by link down signaling, so the software would reset its internal link down timer 87 and then wait for another link up to down transition before restarting the 50 second timer.

The mode selector 22 enables multiple cycle detection mode to be selected as an operational mode for the port. This mode enables the fiber 14 to be disconnected temporarily without causing the ports at the ends of the fiber to associate the disconnection with a failure on another fiber. Accordingly, using this mode the ports will be able to transmit data on the other fiber in an uninterrupted manner while allowing normal maintenance to be performed on the network element. Similarly, where links are not likely to be intentionally disconnected, the mode selector enables the immediate mode to be selected as an operational mode for the port in which any loss of signal will be interpreted as not only a problem on the optical fiber connected to the receiver but also as an indication as a fault on the fiber associated with the transmit interface. In this mode the transmit interface may be shut down more quickly to minimize the loss of data that may occur where there is a fault on the fiber.

Figure 5:
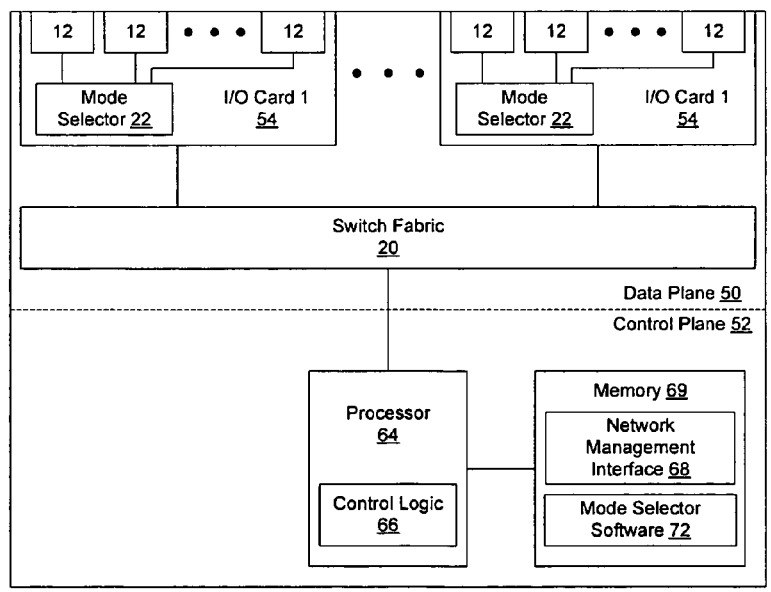
FIG. 5 is a functional block diagram of a network element employing optical ports configured according to an embodiment of the invention.

FIG. 5 illustrates a network element that may be configured to implement an embodiment of the invention. As shown in FIG. 5, the network element includes a data plane 50 and a control plane 52. The data plane includes a plurality of Input/Output (I/O) cards (I/O cards 1-n) 54 and a switch fabric 20. I/O cards and switch fabrics are well known components in the telecommunication area and, accordingly, their function will not be described in greater detail herein. Other data plane architectures may be used as well and the invention is not limited to use on a network element implemented using an architecture that is the same as that shown in the example of FIG. 5.

Figure 1:
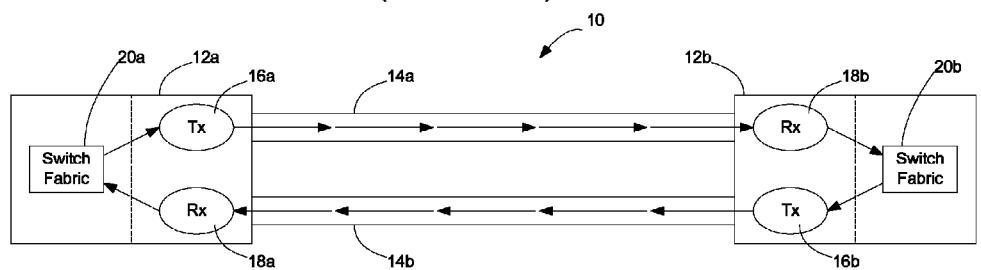
FIG. 1 is a functional block diagram of an optical link extending between two ports.
Figure 2:
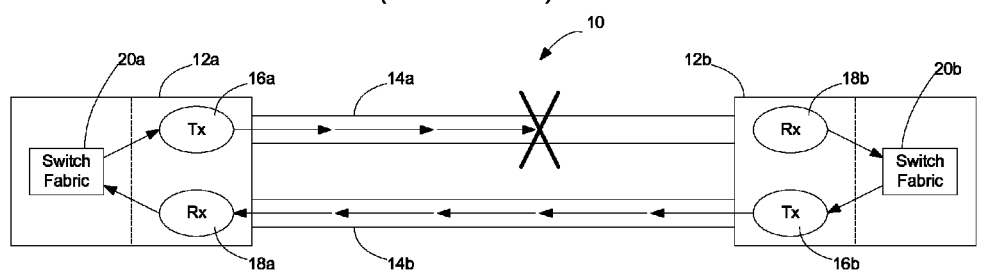
FIG. 2 is a functional block diagram of an optical link extending between two ports illustrating a loss of signal on one of the fiber channels.

The I/O cards in this embodiment contain the ports 12 configured in accordance with an embodiment of the invention. As shown in FIG. 1, the I/O cards also may include a mode selector 22 interfaced to each of the ports to enable the mode selected for a particular port to be individually selected on the network element. The invention is not limited to the particular manner of implementing the mode selector on the network element as the mode selector may be implemented in software and instantiated in a number of different processors on the network element.

The network element also includes a control plane 52 configured to control operation of the network element. One aspect that may be controlled, according to an embodiment of the invention, is how the individual ports handle loss of signal on their attached fibers. The control plane may contain a CPU 64 containing control logic 66 configured to implement a network management interface 68 such as a command line interface or other user interface that may be used to set the mode for particular ports. The invention is not limited to the particular manner in which the network administrator is allowed to input mode selection information for particular ports on the network element.

In the embodiment shown in FIG. 5, the mode information set by the network manager will be provided to the mode selector software 72 resident on the control plane 52, which will use the mode selection information to program the data plane 50 to cause the data plane 50 to operate as intended by the network administrator. For example, the mode selector software may cause the appropriate settings to be set in the mode selector 22 in the I/O cards 54 so that the ports 12 on the I/O cards may be caused to operate in the intended manner.

The mode of operation may be selected on a per port basis, per port group basis, per I/O card basis, or per network element basis. The invention is not limited to this particular implementation as other ways of utilizing the mode information within the network element may be implemented as well to enable the particular mode information to be passed to the components that are able to use the mode information to control operation of the ports of the network element.

The network administrator may perform mode selection to select between multiple cycle detection mode and immediate mode for individual ports, groups of ports, or for the network element as a whole. Additionally, the network administrator may be provided with the option of selecting the number of cycles that should be received before declaring a fault on the transmit fiber 14a when the mode selected is the multiple cycle detection mode. Other modes of operation may be programmed as well, and selected using the mode selector, and the invention is not limited to an embodiment that implements only these described modes of operation.

Figure 6:
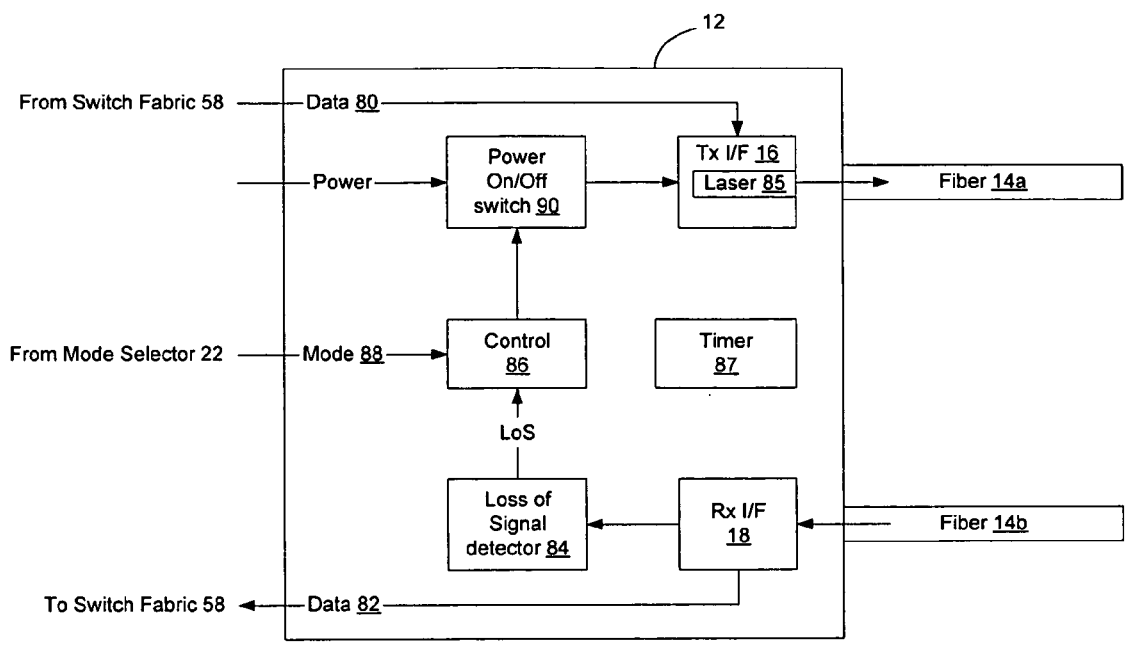
FIG. 6 is a functional block diagram of an optical port according to an embodiment of the invention.

FIG. 6 illustrates a port 12 configured according to an embodiment of the invention. As shown in FIG. 6, the port 12 generally includes a transmit interface 16 configured to transmit optical signals onto a first optical fiber 14a, and receive interface 18 configured to optical signals from a second optical fiber 14b. Data 80 received at the port from the switch fabric 20 (see FIG. 4) will be passed to the transmit interface 16 and used to modulate the output of a transmit laser associated with the transmit interface 16 to cause the light to be modulated for transmission over the optical fiber. Light received at the receive interface 18 over fiber 14b will be converted to electrical signals and output from the port as data 82 and forwarded to the switch fabric 20 in a conventional manner.

The port 12 also includes a loss of signal detector 84 configured to detect when laser light is not being received from the fiber 14b. If there is a loss of signal on the fiber 14b, as registered by the receive interface 18, the loss of signal detector 84 will provide an input to a controller 86. The controller 86 is configured in this embodiment to enable the port to interpret a loss of signal at the receiver differently depending on the mode signal or data 88 that has been transmitted to control the manner in which the port is to operate. The mode signal 88 is transmitted to the port 12 from the mode selector 22.

Upon detection of a loss of signal at the detector, the loss of signal detector 84 will output a loss of signal to the control 86. The control 86 will notify its applications that the receive link is down. Depending on the mode of operation, the loss of signal on the receive fiber 14b may be immediately interpreted as a fault on the transmit fiber 14a, or may instead may be allowed to continue for a period of time, e.g. a set number of cycles. The manner in which the loss of signal is interpreted with respect to fiber 14a will depend on the mode 88 as set by the mode selector 22 (see FIG. 4). Specifically, in the immediate mode, the loss of signal will immediately be interpreted as a fault on fiber 14a, whereas in the multiple cycle detection mode a repetitive loss of signal must be sensed on the fiber 14b before the control 86 will declare a fault on fiber 14a.

If the loss of signal detector 84 sees the signal on the fiber 14b return, the mode in which the port is operating may make a difference as to how the port operates. Specifically, if the port 12 is in a first mode in which any loss of signal is to be interpreted as a fault on the transmit fiber 14a, the port will, immediately upon receipt of a loss of signal at the loss of signal detector, cause the transmit laser in the transmit interface 16 to stop transmitting data on the transmit fiber 14a. To verify whether the loss of signal is transient or part of a pattern intentionally being transmitted by a port on the other end of the optical fiber bundle, the control will require the signal on the receive fiber to be up for more than 8 seconds prior to enabling the transmit laser to resume transmitting data. An advantage of this mode of operation is that data may be stopped immediately upon detection of a loss of signal on the receive fiber so that a minimal amount of data may be lost on the transmit fiber 14*a*. A down-side is that the immediate mode causes the transmit interface to be shut down for several seconds during normal maintenance on the other fiber 14*a*.

If the multiple cycle detection mode is selected, when the loss of signal detector 84 detects a loss of signal at the receive interface 18, the controller 86 will wait to determine if the loss of signal is transient or part of a pattern intentionally being transmitted by a port on the other end of the optical fiber bundle. If the control 86 determines that the loss of signal is repeating with the appropriate frequency and duty cycle for a number of cycles, the control will interpret the pattern as a fault on the transmit fiber and cause the transmit interface 16 to be shut down.

In the described example, the frequency of the pattern is 12 seconds and the duty cycle is ⅔ with the laser off for 4 seconds and on for 8 seconds. Other frequencies and duty cycles may be used as well and the invention is not limited to an embodiment that uses these particular frequencies and duty cycles. Also, in the multiple cycle detection mode, the control will look for five cycles before interpreting the received pattern as a fault on the transmit fiber. The invention is not limited in this manner as other numbers of cycles may be used to identify a fault on the transmit fiber. Although the previous example has focused on a situation in which the software is used to detect a fault on the fiber 14*a*, the invention is not limited in this manner as the software may also be used to detect a fault on the transmit interface 16*a* or on the receive interface 18*b*.

It should be understood that all functional statements made herein describing the functions to be performed by the methods of the invention may be performed by programmable logic such as software programs implemented utilizing subroutines and other programming techniques known to those of ordinary skill in the art. Where the programmable logic is implemented as software, the software may be stored as one or more sets of program instructions that are stored in a computer readable memory 69 within the network element and executed on one or more processors within the network element. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. The invention is not limited to a software embodiment, however, as the programmable logic may also be implemented in a Field Programmable Gate Array (FPGA) or other programmable hardware implementation. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method for detecting a fault on a first optical fiber connected to a transmit interface of a port, the method comprising:

receiving a command identifying a particular fault detection mode of a plurality of fault detection modes to be associated with the port;

receiving, at a receive interface of the port, a loss of signal indication on a second optical fiber connected to the receive interface of the port;

interpreting the received loss of signal indication on the second optical fiber according to the particular fault detection mode associated with the port based on the command, the particular fault detection mode comprising an immediate mode wherein the received loss of signal indication is immediately interpreted as a fault on the first optical fiber connected to the transmit interface of the port or a multiple cycle detection mode wherein the received loss of signal indication at the receive interface on the second optical fiber is received for a particular number of cycles before being interpreted as the fault on the first optical fiber connected to the port, wherein the command identifies the multiple cycle detection mode and the particular number of cycles, wherein when the particular fault detection mode associated with the port is set to the immediate mode, interpreting the received loss of signal indication is performed so that any loss of signal indication on the second optical fiber is interpreted to indicate the fault on the first optical fiber connected to the port.

2. A network element, comprising:

a plurality of ports, each of the ports being connectable to a respective transmit fiber and a respective receive fiber; and programmable logic configured to receive, for each port of the plurality of ports, an individual command identifying a particular fault detection mode of a plurality of fault detection modes to be associated with each port, said particular fault detection mode determining how each port will react after receipt of a loss of signal indication on the respective receive fiber connected to each port by specifying whether the receipt of the loss of signal indication will be interpreted as an immediate indication of a change in a status of the respective transmit fiber connected to each port or whether the receipt of the loss of signal indication on the respective receive fiber must exist for a particular period of time before being interpreted as an indication of the change in the status of the respective transmit fiber connected to each port, wherein a first particular fault detection mode is an immediate mode and a second particular fault detection mode is a multiple cycle detection mode that enables each port associated therewith to interpret a repetitive loss of signal indication pattern on the respective receive fiber connected to each associated port as an indication of a fault associated with the respective transmit fiber connected to each associated port.

3. The network element of claim 2, wherein the immediate mode enables each port associated therewith to interpret the loss of signal indication on the respective receive fiber connected to each associated port as an immediate indication of a fault associated with the respective transmit fiber connected to each associated port.

4. The network element of claim 2, wherein the repetitive loss of signal indication pattern has an oscillation period and duty cycle, and wherein the programmable logic further enables a number of oscillations required to interpret the repetitive loss of signal indication pattern as the indication of a fault to be adjusted.

5. The network element of claim 2, wherein the programmable logic is configured to enable the particular fault detection mode to be selected for groups of ports of the plurality of ports.

6. The network element of claim 2, wherein groups of ports of the plurality of ports reside on Input/Output (I/O) cards, and wherein the programmable logic is configured to enable the particular fault detection mode to be selected for the ports on a per-I/O card basis.

7. The network element of claim 2, further comprising a switch fabric interconnecting the plurality of ports.

8. A network element, comprising:
a plurality of ports, each of the ports being connectable to a respective transmit fiber and a respective receive fiber; and
programmable logic configured to receive, for each port of the plurality of ports, an individual command identifying a particular fault detection mode of a plurality of fault detection modes to be associated with each port, said particular fault detection mode determining how each port will react after receipt of a loss of signal indication on the respective receive fiber connected to each port by specifying whether the receipt of the loss of signal indication will be interpreted as an immediate indication of a change in a status of the respective transmit fiber connected to each port or whether the receipt of the loss of signal indication on the respective receive fiber must exist for a particular period of time before being interpreted as an indication of the change in the status of the respective transmit fiber connected to each port, wherein a first particular fault detection mode is an immediate mode and a second particular fault detection mode is a multiple cycle detection mode, wherein the immediate mode enables each port associated therewith to interpret the loss of signal indication on the respective receive fiber connected to each associated port as an immediate indication of a fault associated with the respective transmit fiber connected to each associated port.

9. The network element of claim 8, wherein the multiple cycle detection mode enables each port associated therewith to interpret a repetitive loss of signal indication pattern on the respective receive fiber connected to each associated port as an indication of a fault associated with the respective transmit fiber connected to each associated port.

10. The network element of claim 8, wherein the repetitive loss of signal indication pattern has an oscillation period and duty cycle, and wherein the programmable logic further enables a number of oscillations required to interpret the repetitive loss of signal indication pattern as the indication of a fault to be adjusted.

11. The network element of claim 8, wherein the programmable logic is configured to enable the particular fault detection mode to be selected for groups of ports of the plurality of ports.

12. The network element of claim 8, wherein groups of ports of the plurality of ports reside on Input/Output (I/O) cards, and wherein the programmable logic is configured to enable the particular fault detection mode to be selected for the ports on a per-I/O card basis.

13. The network element of claim 8, further comprising a switch fabric interconnecting the plurality of ports.

* * * * *